United States Patent [19]

Chapman

[11] Patent Number: 5,387,428
[45] Date of Patent: Feb. 7, 1995

[54] METHOD FOR MAKING A BASE FOR A HOLLANDAISE-TYPE SAUCE AND PRODUCTS THEREOF

[76] Inventor: Scott M. Chapman, 1580 SW. 14th Dr., Boca Raton, Fla. 33486

[21] Appl. No.: 135,843

[22] Filed: Oct. 18, 1993

[51] Int. Cl.$^6$ ............................ A23L 1/39; A23L 1/32
[52] U.S. Cl. .................................... 426/573; 426/589; 426/614; 426/564; 426/613
[58] Field of Search ............... 426/573, 589, 614, 613, 426/602, 652, 564

[56] References Cited

U.S. PATENT DOCUMENTS 4,420,495 12/1983 Hammer et al. .................... 426/589

OTHER PUBLICATIONS

Rombauer et al, Joy of Cooking, Bobbs–Merrill Co. Inc. 1975 pp. 358–359.

Primary Examiner—Jeanette Hunter

[57] ABSTRACT

The method for making a sauce base comprises mixing together lemon or lime juice, sugar, seasoning and egg yolks to produce a sauce-base mixture that is free from butter and butter substitutes. The sauce-base mixture is frozen, and then stored until its use is anticipated. The method for making the desired sauce includes thawing a quantity of said base to about room temperature, preparing liquid whole butter, and then mixing and homogenizing the base and liquid butter until the desired foamy sauce is produced.

17 Claims, No Drawings

METHOD FOR MAKING A BASE FOR A HOLLANDAISE-TYPE SAUCE AND PRODUCTS THEREOF

BACKGROUND OF THE INVENTION

1. Field of the Invention

This invention relates to a novel method for preparing a base for a hollandaise-type sauce and to the novel product of that method. The invention includes also a novel method for making a hollandaise-type sauce using the novel sauce base.

2. Description of the Prior Art

Hollandaise sauce and bernaise sauce are two of a class of rich foamy hollandaise-type sauces that are frequently used in fancy cooking. Hollandaise-type sauces are ordinarily made in a warmed container by beating a mixture of egg yolks, clarified butter, lemon juice and selected seasonings to impart a light, foamy, homogeneous consistency to the mixture. The foamy mixture or sauce is then dispensed on meat, fish, etc. just prior to being served. These sauces are difficult to make to a consistently high quality standard because of narrow tolerances for the process factors involved. Such process factors include the time and degree of heating and beating the mixture, the amount of air beaten into the mixture, the degree of homogeneity required, etc. Also, extra steps and effort are required to prepare liquid clarified butter prior to mixing with the other ingredients of the recipe. Liquid clarified butter may be prepared by melting a quantity of ordinary butter in a container over low heat until it is brought almost to boiling. The heat is removed and the liquid butter is allowed to stand for a few minutes while the milk solids therein settle to the bottom of the container. The liquid butter fat is skimmed off the top leaving the milk solids in the bottom of the container, which are discarded. The skimmed off clear yellow butter fat is clarified butter. After the sauce is dispensed, it may change in color and/or texture, or the ingredients therein can separate in a short period of time due to coagulation, evaporation, for example, rendering the dispensed sauce less attractive. Frequently, when the sauces are served in restaurants, they have separated or are poorly flavored due to doctoring in the kitchen; that is, the sauce was modified after the characteristics of the sauce deteriorated prior to dispensing.

Still, there is a great demand for hollandaise-type sauces for both restaurant and home use, and many variations in the recipe and the process of making have been suggested to overcome the above mentioned and other problems, and also to lower the cost of the sauce. For example, U.S. Pat. No. 4,420,495 to J. Hammer el. at. discloses a method and an apparatus for making hollandaise-type sauces in small and large quantities, substantially on demand, which method is particularly is adapted for use in restaurants. In that prior method, batches the entire sauce recipe, including the egg yolks, molten butter, lemon juice and seasoning are mixed without foaming and then frozen. Then, as need is anticipated, batches of the frozen mixture are thawed to temperatures of less than 50° C. and held in readiness. When there is an actual need for the final sauce, one or more thawed batches is admixed with air and homogenized, preferably with the equipment disclosed in that patent.

Freezing and then thawing the whole sauce mixture has been suggested prior to the disclosure in the Hammer et. al. While freezing adds some shelf life to the mixture, the added shelf life is not substantial and is not adequate for practical distribution of the frozen mixture in supermarkets and the like. Also the texture and flavor of the finished sauce made from the frozen mixture changes with respect to storage time of the frozen mixture. Also, the sauce is prone to separate after it is dispensed.

OBJECTS OF THE INVENTION

An object of this invention is to provide a novel method for making a base for a hollandaise-type sauce and to the product of that method.

Another object is to provide a novel method for making a hollandaise-type sauce using the novel sauce base.

Still another object is to provide a novel sauce base having a relatively long shelf life.

Another object is to provide a novel hollandaise sauce base which can be used to advantage with whole unclarified butter to produce an improved hollandaise-type sauce.

Yet another object is to provide a novel hollandaise-type sauce base which, when used in the novel method, produces a hollandaise-type sauce that does not change in color or texture and that does not separate while standing for a substantial time after the sauce is prepared.

Another object is to provide a method for making a hollandaise-type sauce that can be used by a person having little culinary skill to make a consistently good hollandaise-type sauce.

SUMMARY OF THE INVENTION

These and other objects of the invention can be achieved with the novel method for making a base for a hollandaise-type sauce comprising mixing together predetermined quantities of lemon or lime juice, sugar, seasonings and egg yolks to produce a sauce base mixture that is free from butter and butter substitutes. The sauce-base mixture is then frozen to produce the novel sauce base, and then the frozen sauce-base is stored.

The step of freezing modifies the butter-free mixture to produce a chemically-stable, thixotropic gel after it is thawed. The frozen sauce base, which is defined by its process of making, has a long shelf life and can be stored for substantial periods of time without deterioration or effect on its subsequent use. The frozen sauce base can be packaged in unit amounts of sauce with more than adequate shelf life for distribution through most retail and food outlets.

The novel method for preparing a hollandaise-type sauce comprises providing a first predetermined quantity of the novel frozen sauce base, thawing the first predetermined quantity to about room temperature, preparing a second predetermined quantity of liquid whole or clarified butter, and mixing the first quantity with the second quantity to produce an intermediate mixture. Then, the intermediate mixture is homogenized while admitting air or similar gas into the mixture, as by high shear mixing in a blender, homogenizer, food processor, or the like, until a foamy sauce is produced. Optionally, additional seasonings can be added to the intermediate mixture.

Unlike prior methods, the novel method of making the frozen base and the frozen product thereof is free from butter and butter substitutes, which substantially reduces the amount of fat globules in the base and thereby increases the shelf life of the thawed base. The lemon juice, besides being a seasoning, lowers pH of the sauce base, thereby reducing bacterial action in the frozen sauce base. The use of a frozen and thawed base containing egg yolks and lemon juice produces a final sauce which is thicker, is not as pale as, and does not have the flavor of a sauce made from a frozen and thawed recipe containing all of the ingredients including butter. The presence of sugar helps to stabilize the cooked, but fluid, egg yolks keeping the egg yolks in the final sauce from separating, and also reduced the amount of salt that is used. The step of freezing reduces oxidation and bacterial action in the frozen sauce base and also produces a rheologically-stable, homogeneous, thixotropic gel which has a long shelf life. Freezing and then thawing the base so affects the base that the final sauce produced therefrom does not separate, does not change in color or texture upon standing. Unclarified whole butter, which is beaten with the sauce base, provides optimum in flavor and texture in the final sauce while reducing the cost of and time required to prepare the final sauce.

DETAILED DESCRIPTION OF THE INVENTION INCLUDING THE PREFERRED EMBODIMENTS

Generally, the novel method of making a hollandaise-type sauce and any of its variations comprises preparing a sauce base by combining egg yolks with sugar, lemon juice and other seasonings, freezing the resultant egg-yolk mixture which is free from butter and butter substitutes, packing units of the mixture for retail or food service distribution. When the user is ready to prepare the desired sauce, the frozen egg-yolk mixture can be defrosted by placing in a refrigerator overnight, or by placing under running water, or by allowing it to stand in the open at room temperature. After thawing, a first predetermined quantity of the egg-yolk mixture is placed in a food processor or blender or other high-shear machine. The high-shear machine is turned on and a second predetermined quantity of liquid whole or clarified butter or butter substitute is poured over the egg-yolk mixture in a steady stream until the entire amount is added. If desired, added seasonings can be included with the clarified butter. When the desired degree of homogenization is achieved, turn off the machine and the sauce is finished and ready for use.

In all of the following examples, the quantities of the ingredients in the recipes are for use with one pound of whole butter. It is to be understood that, if larger or smaller quantities are to be used, then each ingredient of the recipe will be increased or decreased in proportion with the amount of butter to be used and the quantity of sauce that is required.

Example 1 - Base for Hollandaise-Type Sauce

Provide the following ingredients which are to be used subsequently with one pound (960 volume parts) of unclarified whole butter:

| | Volume Parts |
| --- | --- |
| Four (4) ounces egg yolks | 240 |
| Two (2) teaspoons lemon juice. | 8 |
| One (1) teaspoon white wine. | 4 |
| One (1) teaspoon white vinegar | 4 |
| One-half (½) teaspoon sugar | 2 |
| One-quarter (¼) teaspoon white pepper | 1 |

| -continued | |
| --- | --- |
| | Volume Parts |
| One-quarter (¼) teaspoon Tabasco sauce | 1 |
| One-quarter (¼) teaspoon Worcestershire sauce | 1 |

Place the egg yolks in a bowl, add the remaining ingredients to the egg yolks with a vigorous stirring until a even mixture is produced. Then, pour the mixture into a bowl and freeze the mixture to produce a hard semi-solid gel. The semi-solid body may be packaged and stored for substantial periods of time without deterioration. The amount of the various seasonings may be varied to suit particular taste in the final product. The foregoing recipe is used for preparing about twenty (20) ounces of final sauce. However, packages can be prepared for producing different amounts of sauce. preferably ten (10) ounces, twenty (20) ounces, forty (40) ounces, sixty (60) ounces or eighty (80) ounces depending on the use.

Example 2 - Hollandaise Sauce

The product of Example 1 is thawed to room temperature to produce a soft semi-solid gel, and then placed in a blender. The blender is mined on at low speed to break up the semi-solid gel of the product, and one (1) pound of liquid unsalted whole unclarified butter is slowly poured over the gel in a steady stream until the entire amount of butter has been added. Slightly salted or salted whole butter can be substituted for unsalted butter. The machine is then speeded up to completely homogenize the mixture of gel and butter and to whip requisite amounts of air into the mixture. The rapid mixing is continued until a desired amount of air is whipped into the mixture and the desired texture is realized. At this point the machine is turned off and the preparation of the sauce is completed and may be dispensed on food directly. Alteratively, the sauce has a relatively long shelf life and can be dispensed on food over a substantial period of time after preparation.

Example 3 - Bernaise Sauce

Follow the directions of Example 1 and 2, except add two (2) teaspoons, or eight (8) volume parts, of tarragon reduction to the recipe in Example 1 before freezing. Tarragon reduction can be prepared in the following manner. Place tarragon leaves in a sauce pan and cover them with white vinegar. Then cook the vinegar-covered leaves until all of the liquid is evaporated. The product is tarragon reduced.

Example 4 - Herbal Hollandaise Sauce

Follow the instructions of Examples 1 and 2, except add to the recipe of Example 1 the following ingredients:

| | volume parts |
| --- | --- |
| One (1) tablespoon chopped fresh oregano | 4 |
| One and one-half (1½) teaspoons chopped fresh thyme | 3 |
| One (1) teaspoon chopped fresh basil | 2 |

This addition is made to the recipe before freezing.

Example 5 - Lobster Hollandaise Sauce

Follow the procedure described above for Examples 1 and 2, except add about two (2) tablespoons, or eight (8) volume parts, of lobster glaze to the thawed mixture with whole butter prior to the high-shear mixing. Lobster glaze is made by taking basic lobster stock and reducing it to the nth degree, until the stock forms a even coating on a spoon inserted into it. For commercial practice, lobster glaze will be packaged separately and instructions will be given for adding the glaze to the sauce base after the whole butter is added.

Example 6 - Banana Hollandaise Sauce

Follow the instructions given in Examples 1 and 2, except, in Example 2, add about eight (8) volume parts pureed banana paste to the mixture with whole butter prior to the high-shear mixing: To prepare pureed banana paste, two (2) bananas are pureed with two (2) ounces banana liqueur and cooked until the mixture is a thick paste. The banana pureed paste can be packaged separately and added according to these directions.

What makes the novel processes unique and advantageous are at least the following:

1. it eliminates the long drawn out hand process which requires years of practice and skill to make a hollandaise-type sauce of acceptable quality from scratch.
2. by combining the raw egg yolks and lemon juice together and freezing them, the juice cures the egg yolks, changing the texture of the mixture and allowing melted whole butter to be emulsified therewith subsequent to thawing with the use of common kitchen appliances.
3. by using the novel sauce base, the flavor of the finished sauce is consistent time after time which is important in all institutional kitchens.
4. it allows a person with just average, or very little culinary skills, to produce sauces that up until now only the most experienced chefs could produce successfully.

There are similar methods of making hollandaise-type sauces described in cookbooks that use raw egg yolks right out of the refrigerator. Because the yolks are raw and not cooked or cured, the resulting sauce comes out much thinner, more pale and has the flavor of uncooked eggs. It also does not have the durability of the sauce made by the novel method. By durability it is meant that the sauce made from the novel sauce base does not separate under the following conditions:

1. sitting on a hot serving line in an institutional kitchen for the duration of the serving hours,
2. being exposed to extreme heat by being placed under a hot broiler for browning,
3. can be made ahead of time to allow for other things to be done at the last minute at a home or dinner party.

The foregoing examples and descriptions thereof are provided as illustrative of some of the preferred embodiments of the concepts of this invention. While these embodiments represent what is regarded as the best modes for practicing this invention, they are not intended as delineating the scope of the invention, which is said forth in the following claims.

What is claimed is:

1. A method for preparing a frozen sauce base for a Hollandaise-type sauce having an extended shelf life and which, when subsequently thawed and whipped with liquid whole butter, produces an edible foamy butter sauce that does not settle upon standing at room temperature, said method comprising: A. mixing together prescribed quantities of lemon juice, sugar, seasonings, and egg yolks to produce a sauce-base mixture, said mixture being free from egg whites, butter and butter substitutes, B. freezing said sauce-base mixture to produce said frozen sauce base, consisting essentially of a rheologically stable gel, and C. storing said frozen gelled sauce base.

2. The method defined in claim 1 wherein said prescribed quantities of egg yolks, lemon juice, and sugar are present in volume proportions about 120 to 4 to 1, respectively.

3. The method defined in claim 1 wherein step B. includes freezing said sauce-base mixture in quantities of unit volume.

4. The method defined in claim 1 wherein said seasonings include at least one member of the group consisting of white wine, vinegar, Worcestershire sauce, Tabasco sauce, tarragon, oregano, thyme and basil.

5. The method defined in claim 1 wherein said sauce-base mixture consists essentially, in about the indicated volume pans, of:

240 parts egg yolks,
8 pans lemon juice,
4 pans white wine,
2 parts sugar,
1 part white pepper,
1 part Tabasco sauce, and
1 part Worcestershire sauce.

6. The method defined in claim 4 wherein sauce-base mixture includes also about eight (8) parts by volume tarragon reduction.

7. The method defined in claim 4 wherein said sauce-base mixture includes also about four (4) volume parts chopped fresh oregano, three (3) parts chopped fresh thyme, and two (2) parts chopped fresh basil.

8. A frozen sauce base for a Hollandaise-type sauce consisting essentially of a butter-free gel prepared by the method defined in claim 1 and which, when thawed and whipped with liquid whole butter, produces an edible foamy Hollandaise-type sauce which does not settle or separate upon standing at room temperature.

9. A frozen sauce base consisting essentially of a butter-free gel prepared by the method defined in claim 3 and which, when thawed and whipped with liquid whole butter, produces an edible foamy Hollandaise-type sauce which does not settle or separate upon standing at room temperature.

10. A frozen sauce base for a Hollandaise-type sauce consisting essentially of a butter-free gel prepared by the method defined in claim 5 and which, when thawed and whipped with liquid whole butter, produces an edible foamy Hollandaise-type sauce which does not settle or separate upon standing at room temperature.

11. A frozen sauce base consisting essentially of a butter-free gel prepared by the method defined in claim 6 and which, when thawed and whipped with liquid whole butter, produces an edible foamy Hollandaise-type sauce which does not settle or separate upon standing at room temperature.

12. A frozen sauce base consisting essentially of a butter-free gel prepared by the method defined in claim 7 and which, when thawed and whipped with liquid whole butter, produces an edible foamy Hollandaise-type sauce which does not settle or separate upon standing at room temperature.

13. A method for preparing a hollandaise-type sauce that does not settle or separate upon standing at room temperature, said method comprising:

A. providing a first predetermined quantity of frozen sauce base prepared by the method defined in claim 1,
B. thawing said first quantity of frozen sauce base, said thawed quantity comprising a chemically-stable, thixotropic gel,
C. preparing a second predetermined quantity of liquid whole butter,
D. mixing said first quantity with said second quantity to produce an intermediate mixture,
E. and then homogenizing said intermediate mixture while admitting gas into said mixture to produce a foamy hollandaise-type sauce.

14. The method defined in claim 13 wherein predetermined quantities of at least one of lobster glaze and pureed banana paste are added to said intermediate mixture.
15. The method defined in claim 13 wherein said first and second quantities are present in a volume ratio of about 285 parts to 960 parts in said intermediate mixture.
16. The method defined in claim 15 wherein said intermediate mixture includes also about 8 volume parts lobster glaze.
17. The method defined in claim 15 wherein said intermediate mixture includes also about eight (8) volume parts pureed banana paste.

* * * * *